United States Patent [19]

Hendy

[11] Patent Number: 4,939,180

[45] Date of Patent: Jul. 3, 1990

[54] PROCESS OF PRODUCING A COMPOSITE MEMBRANE

[75] Inventor: Brian N. Hendy, Middlesbrough, England

[73] Assignee: Imperial Chemical Industries PLC, London, United Kingdom

[21] Appl. No.: 384,838

[22] Filed: Jul. 25, 1989

Related U.S. Application Data

[62] Division of Ser. No. 24,198, Mar. 10, 1987, Pat. No. 4,866,099.

[30] Foreign Application Priority Data

Mar. 10, 1986 [GB] United Kingdom ............... 8605817

[51] Int. Cl.$^5$ .............................................. C08D 5/20
[52] U.S. Cl. .................................... 521/27; 521/28; 521/64; 524/465; 524/475; 427/244; 427/245; 427/246; 427/384; 210/500.41; 210/650; 210/653; 210/654

[58] Field of Search ....................... 521/27, 28, 64; 524/465, 475; 427/244, 245, 246, 384; 210/560.41, 650, 653, 654

[56] References Cited

U.S. PATENT DOCUMENTS

| | | | |
|---|---|---|---|
| 4,054,707 | 10/1977 | Quentin | 428/213 |
| 4,714,725 | 12/1987 | Hendy et al. | 524/108 |
| 4,866,099 | 9/1989 | Hendy | 521/64 |

Primary Examiner—John Kight, III
Assistant Examiner—S. Acquah
Attorney, Agent, or Firm—Cushman, Darby & Cushman

[57] ABSTRACT

A process for producing a composite membrance in which a sulphonated polymer is appled to the surface of a porous substrate, treating the polymer, in situ, on the substrate with cations of a polyvalent metal and converting the treated coating into a water insoluble layer on the support. The polyvalent metal may preferably by aluminum or chromium.

17 Claims, No Drawings

PROCESS OF PRODUCING A COMPOSITE MEMBRANE

This is a division of U.S. application Ser. No. 07/024,198, filed Mar. 10, 1987, now U.S. Pat. No. 4,866,099.

The invention relates to a membrane for eg reverse osmosis and to polymers from which it can be made.

According to the invention a sulphonated polymer contains repeating units (—Ar—Y—)

where Y is —SO$_2$— and/or CO; and
Ar is a divalent aromatic radical, which may differ from unit to unit in the polymer chain, at least 50% molar of groups Ar carrying at least one group —SO$_3$M where M is 1/m of a polyvalent metal cation, in at least 80% of groups SO$_3$M, where m is the valency of the ion.

Ar may be a mono- or poly- aromatic for example meta- or para-phenylene or biphenylene and preferably contains at least two aromatic rings linked together by particularly —O—, —S—, —SO— —SO$_2$—, —CO—, a divalent substituted or unsubstituted aliphatic hydrocarbon radical or a residue of a diol. If Ar contains at least two aromatic rings linked together by the residue of a diol, this diol may be hydroquinone or a 4,4'-bisphenol such as 2,2-bis (4-hydroxyphenyl) propane.

Preferably Ar contains at least two aromatic groups linked together by oxygen, and especially is of formula (—Ph$^1$—O—)$_n$Ph$^1$ where Ph$^1$ is phenylene preferably meta- or para-phenylene and at least some of the groups Ph$^1$ are sulphonated; and n is 1 or 2, and the value of n can differ along the polymer chain.

Such sulphonated polymers are among those described in more detail in our EP-A No. 8894, 8895, and 41780.

The sulphonated polymers are of high molecular weight. Most of them are soluble in N,N-dimethylformamide and typically have an RV of at least 0.2, preferably at least 0.4, up to 2.5 and preferably not more than 2.0.

A preferred sulphonated polymer contains repeating units - Ph$^3$- and -Ph$^2$ Y Ph$^2$ - linked through ether linkages. Some at least of these units are present as repeating units (—Ph$^2$—O—Ph$^3$—O—Ph$^2$—Y—)        I together with repeating units (—Ph$^2$—O—Ph$^2$—Y—)        II and optionally also with repeating units (—Ph$^2$—O—Ph$^2$—O—Ph$^2$—Y—)        III where Ph$^2$ is phenylene preferably meta- or para- phenylene;
Ph$^3$ is phenylene preferably meta- or para- phenylene having one or two groups —SO$_3$M
Whereas the polymers of our prior applications are readily sulphonated, those in which n is only one require more powerful sulphonation agents. If Y is sulphone, sulphonation may be effected using chlorosulphonic acid or using sulphur trioxide, as described in U.S. Pat. No. 4,413,106. If Y is ketone, sulphonation may be effected by the procedures of Journal of Polymer Science, Polymer Chemistry Edition, Vol 23 (1985) pages 2205 to 2223. Polymers containing units in which n is two are more readily sulphonated and, in particular, those containing units (—Ph$^2$—O—Ph$^2$—O—Ph$^2$—SO$_2$—)

in which the Ph$^2$ is meta- or para- phenylene are essentially completely sulphonated by concentrated sulphuric acid after one hour at ambient temperature.

The ion-exchange capacity, and hence the effectiveness for reverse osmosis of the sulphonated polymers is proportional to the extent of sulphonation. However, monovalent cation salts of completely sulphonated polymers in which n is 2 are soluble in water and those of corresponding incompletely sulphonated polymers are soluble or are swollen in contact with water. Thus, hitherto such materials have not been used for the production of reverse osmosis membranes.

Preferred polymers according to the invention are essentially insoluble in water and preferably even in boiling water. Made therefrom a reverse osmosis membrane, or layer of sulphonated polymer in a composite membrane, retains its integrity in the aqueous environment it is commonly in contact with. By "swollen" is meant an increase of at least 50%, more typically at least 100%, by weight after immersion in water at ambient temperature in 24 hours. It is generally preferred that the proportion of unsulphonated repeating units is low for example less than 30 preferably less than 10, especially less than 1% the total repeating units.

The polymers may be obtained by cation-exchanging sulphonated polymer in its acid or mono-valent cation salt from.

More specifically, a sulphonated polymer which contains the defined repeating units and cations of hydrogen and/or a monovalent metal and/or monovalent onium is heated to least 50° C. in the presence of polyvalent cations in a quantity at least sufficient to exchange with cations M$^2$ for a sufficient time to form a material less soluble, preferably essentially insoluble, in water.

The starting sulphonated polymer may be in solution in for example water, aqueous acetone or aqueous methanol, or in solid form, for example a coating on a support, for example a porous support. The polyvalent cations are preferably used as an aqueous solution. If the cations are of a metal, suitable metals are magnesium, copper nickel, iron, cobalt, aluminium and chromium.

Heating is preferably at 60° C. or over but in general temperatures substantially over 100° C. are unnecessary. If a solution of the starting sulphonated polymer is used, addition of an aqueous solution of the polyvalent salt at ambient temperature results either in a clear solution or a thin, milky, colloidal precipitate. Heating this mixture results in the formation of a precipitate which is readily filtered. We prefer to use an excess of polyvalent salt relative to the SO$_3$M groups, particularly at least four, especially at least eight, equivalents.

If the sulphonated polymer is in solid form, particularly a coating on a porous support, it my be immersed in a solution of the polyvalent salt and heated to the desired temperature, the concentration and volume of the solution being sufficient to provide the desired excess of the metal ion.

Membranes for use in an aqueous medium, for example in ultrafiltration or reverse osmosis, may be formed from the salts of the polymers directly by forming a solution thereof, casting a film from the solution and coagulating it. Suitable solvents for these salts include N,N-dimethylformamide containing no or up to 25% of weight of water. Alternatively a mixture of two or more non-solvents may be used, as described in more detail in EP-A-142973, 145305, 202849 and 203755. In an alternative procedure a membrane formed from the sulphonated polymer in the hydrogen or mono-valent cation form is converted to the polyvalent cation salt by the procedure described herein.

Thus, there is provided a composite membrane which comprises a layer of a polyvalent metal cation salt of a sulphonated polyarylsulphone or a sulphonated polyarylketone on a porous support formed from a different material.

Very suitably the solution or dispersion formed at ambient temperature possibly in presence of added acid to increase its solubility, is formed into a membrane and then converted to insolubilised form by heating, preferably in a humid atmosphere.

The support typically has pores of diameter in the range 1 to 1000 nm. The diameter may vary through the support, being low on one side and greater on the other side. Low diameter means less than 100, particularly less than 50, but typically at least 5, nm; about 20 nm is especially preferred. Greater diameter means at least 200 but preferably not over 750 nm. The active layer preferably is on the low diameter side of the support. The support typically has characteristics which make it usable as an ultrafiltration membrane and may be a commercially available ultrafiltration membrane. The support be obtained by casting a film from a polymer solution and coagulating it. If the support is a polyarylsulphone, suitable solvents include N,N-dimethylformamide and N-methylpyrrolidone. Coagulation is by immersion in a liquid in which the solvent is soluble but the polymer is not. For many polymers the coagulation bath comprises water. If the polymer is a polyarylsulphone, the coagulation liquid may be an aqueous solution, for example of a salt such as sodium chloride or sodium nitrate or a mixture of non-solvents, particularly of water and an alcohol such as methanol or ethanol. We prefer to use essentially pure water for the production of a support from a polyarylsulphone. For example a support can be obtained by forming a solution (15 to 20% w/w) in N,N-dimethylformamide, of a polyarylsulphone containing the residue of 2,2-bis(4-hydroxyphenyl) propane, casting a film therefrom and coagulating the film by immersion in water.

The support polymer has a sufficiently high molecular weight to be formed into a self-supporting article such as a film. If it is a polyarylsulphone, its molecular weight corresponds preferably to a reduced viscosity (RV), measured at 25° C. as a 1% by weight solution in for example N,N-dimethylformamide, of at least 0.2, preferably at least 0.4. The RV may be up to 2.5 but preferably does not exceed 2.0. Preferred support layer polymers are chosen from those preferred as starting materials for making the sulphonated polymers.

The active layer can be formed on the support by a technique such as gravure roll coating, reverse roll coating, dip coating, bead coating, slot coating or electrostatic spray coating. The resulting layer, when dried, is of the order of one micrometre or less preferably in the range 10 to 1000 nm thick. Drying is conveniently at up to 80° C., preferably up to 40° C., for example at ambient temperature. It is very desirable to protect the coating from dust during drying.

If the layer is applied in the hydrogen form or monovalent cation form it will be post-treated by heating in the presence of a solution containing polyvalent cations; until then it should be stored dry or in a liquid in which it is not soluble. Whereas the polyvalent cation form of the polymer can be dissolved and formed as such into a membrane, in a preferred process for producing a composite membrane a layer of a sulphonated polymer in hydrogen form or monovalent cation form is applied to a porous support and the resulting coated support is heated to at least 50° C. in a solution containing a polyvalent cation salt.

The sulphonated polymer is conveniently applied to the porous support as a solution in eg aqueous methanol and aqueous acetone. Thus, a polymer consisting essentially of repeating units I ($Y=SO_2$) in which the group $Ph^3$ contains one $-SO_3H$ group, can be dissolved in aqueous methanol, for example containing 60 to 80% by volume of methanol. A polymer containing such repeating units and also II ($Y=SO_2$) in the molar ratio 2:3 can be dissolved in aqueous acetone for example containing 80 to 95% by volume of acetone. For a ratio 1:3, the solvent mixture preferably contains a higher proportion of acetone.

The solution of the sulphonated polymer is preferably relatively dilute for example less than 10 g, preferably not more than 5 g especially, down to 2 g, especially to 0.5 g, per 100 cm$^3$ of solvent.

The composite membrane after post-treatment is preferably stored in a liquid in which none of its components dissolve, conveniently water or an aqueous solution of a metal salt, for example of sodium chloride or of a polyvalent cation salt. Before using the composite membrane it is desirably washed several times with water.

The post treatment is preferably with a relatively concentrated solution of the salt, for example 0.1M to 5M, particularly 0.2M to 2M. The coated membrane is preferably held flat during post-treatment. It is very desirable to avoid metal components such as retaining clips, since these are liable to react with the solution.

To ensure constancy in membrane properties, all stages in polymer solution preparation, coating and post-treatment are carefully controlled for example as to time and temperature. During coating and drying it may be desirable to control the humidity, for example to not more than about 65% relative humidity.

The membranes of the invention may be used for the treatment of a wide variety of aqueous or non-aqueous solutions or suspensions by conventional reverse osmosis or ultra-filtration techniques. In particular they may be used for the desalination of sea water and for the purification of brackish water and industrial effluents.

Certain polyarylsulphones, for example those containing repeating units

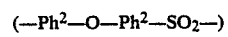
$(-Ph^2-O-Ph^2-SO_2-)$ and/or

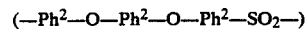
$(-Ph^2-O-Ph^2-O-Ph^2-SO_2-)$ and the sulphonated derivatives thereof are more resistant to the presence of aggressive materials such as acids and alkalis than are membranes formed from other materials such as cellulosics.

EXAMPLE 1

A sulphonated polyarylethersulphone consisting of the repeating unit $(-Ph^2-O-Ph^3-O-Ph^2-SO_2-)$ (where $Ph^2$ is para-phenylene and $Ph^3$ is para-phenylene containing a $SO_3H$ group) and having a reduced viscosity of 0.99 was stored as a solid in dilute sulphuric acid.

This solid was freed of the sulphuric acid by washing with demineralised water by filtration. Since it became highly swollen and very difficult to handle, washing was terminated when the pH reached 2.5. Excess water was removed from the swollen polymer using a filter stick and the polymer was stored in a covered tray until required.

A sample of the swollen polymer was warmed to 40° C. and formed a solution. The solution was cooled to ambient temperature but the polymer remained in solution. Hydrated magnesium sulphate was added as a concentrated solution (about 60% by weight) in demineralised water in an amount sufficient to provide 12 equivalents of magnesium for each equivalent of ($SO_3H$). The mixture remained clear but on heating a precipitate started to form at 70° C. The mixture was heated to 95° C. and then allowed to cool. The precipitate was readily filtered and was washed several times with demineralised water. The precipitate was not swollen by washing with water and appeared to be essentially insoluble in water. The solid was dried at 110° C. for 8 hours at a pressure of not more than 0.1 bar abs.

EXAMPLE 2 TO 11A

The procedure of Example 1 was repeated using different proportions of the metal salt, a different metal salt or both. Similar results to those of Example 1 were obtained. The conditions used are summarised in Table One.

TABLE ONE

| Example | Precipitant (a) | Amount (b) (eq) | Ppt temp (c) (°C.) |
|---|---|---|---|
| 1 | Mg | 12 | 70 |
| 2 | Mg | 8 | 90 |
| 3 | Cu | 8 | 80 |
| 4 | Cu | 16 | 80 |
| 5 | Co | 8 | 65 |
| 6 | Co | 16 | 65 |
| 7 | Ni | 8 | 70 |
| 8 | Ni | 16 | 70 |
| 9 | Zn | 8 | 85 |
| 10 | Zn | 16 | 85 |
| 11 | Al | 9 | 90 |
| 11A | Cr | 4 | 90 |

Notes to Table One
(a) Mg indicates $MgSO_4.7H_2O$
Cu $CuSO_4.5H_2O$
Co $CoCl_2.6H_2O$
Ni $NiSO_4.6H_2O$
Zn $ZnSO_4.7H_2O$
Al $Al_2(SO_4)_3.16H_2O$.
Cr $CrCl_3.6H_2O$
(b) Number of equivalents of the metal ion for each equivalent of $SO_3H$.
(c) This is the temperature at which precipitation was observed to start.

EXAMPLES 12 TO 23

In these examples the porous support was a commercially available ultrafiltration membrane. With the exception of Example 22, it was grade GR 90 PP (which has a cut off of materials having a molecular weight of about 2000) from DDS RO-Division, A/S de Danske Sukkerfabrikker, DK-4900 Nakskov, Denmark, in the form of an annulus of inside and outside diameters of 58 and 201 mm respectively. It composition was polyarylsulphone having repeating units of the formula $(-pPh-C(CH_3)_2-pPh-)$ and $(-pPh-SO_2-pPh-)$ linked in essentially equimolar proportions through ether linkages, where pPh is para - phenylene. It was supplied immersed in a storage solution of glycerol, propanoic acid and aqueous sodium hydroxide.

Each of the examples was carried out using a quarter portion cut from the annulus. The annulus was removed from the storage solution and dabbed lightly with filter paper; the cut portion was clamped at its edges to a glass plate, shielded from dust and allowed to stand for two hours at ambient temperature.

Sulphonated polymer solution were prepared by dissolving in a mixed water/methanol or water/acetone solvent, as follows:
(a) A polymer as used in Example 1 was suspended in water, the mixture was heated with stirring to 60° C. to dissolve it and methanol was added to give a clear solution.
(b) A polymer containing repeating units as in (a) and also $(-Ph^2-O-Ph^2-SO_2-)$ was added to acetone, water was added and the mixture was stirred at ambient temperature to give a solution.

A sample of the polymer solution, typically 12 cm³, was passed through a No 1 sinter into a container. The filtered solution was then coated onto the clamped membrane using a brush. The coated membrane was allowed to dry for two hours at ambient temperature shielded from dust, then either stored until required in aqueous sodium chloride (20 g per 100 cm³) or else treated with a solution of a polyvalent cation salt.

For the treatment with the cation salt solution, the coated membrane was held flat on the glass plate, preferably using non-metal spacers (silicone rubber rings) and a weighted cover plate. The whole assembly was placed in a dish and covered with the solution. The dish and its contents were placed in an oven at 110° C. (with the exception of Example 19) for one to two hours, then removed from the oven and allowed to cool to ambient temperature. The treated membrane was released from the glass plate and stored in a solution of the cation salt until required.

The composite membranes so obtained were tested as reverse osmosis membranes. Prior to testing, they were removed from the solutions in which they had been stored and washed thoroughly by holding in a stream of demineralised water for two minutes.

Using an apparatus of the type described in our prior applications, the porous support of the composite membrane was placed in contact with a porous support assembly of filter paper 3 and plate 4. The coated side, having the layer of sulphonated polysulphone, was subjected to a continuous feed of 0.2 g sodium chloride per 100 cm³ of solution pumped across its surface at a pressure of 4 MNm$^{-2}$ and a temperature of 25° C. The liquid which had passed through the membrane was analysed and the rate of flow of liquid through the membrane was determined.

The conditions of forming the composite membrane including any treatment with a polyvalent cation solution are summarised in Table Two. The results of testing the membranes are given in Table Three.

TABLE 2

| Example (b) | Polymer Type (c) | Polymer Wt (g) | Solvent Type (d) | Solvent Amount (cm³) | Solvent Temp (e)(°C.) | Metal Type (f) | Metal Temp (°C.) (h) | SR | F |
|---|---|---|---|---|---|---|---|---|---|
| 12 | S5 | 0.7 | A W | 25 3.6 | 25 | NIL | NIL | 53 | 3.12 |
| 13 | S5 | 1.81 | A W | 32.3 4.65 | 25 | NIL | NIL | 53 | 0.45 |
| 14 | S10 | 1.4 | A W | 50 5.05 | 25 | NIL | NIL | 56.3 | 1.43 |
| 15 | S2/1 | 2.07 | W M | 16.55 40 | 60 | Al | 90 | 80 | 1.02 |
| 16 | S2/1 | 2.02 | W M | 24.16 58.3 | 60 | Al | 85 | 73.7 | 2.44 |
| 17 | S2/2 | 1.03 | W M | 8.27 20 | 60 | Al | 93 | 96 | 0.28 |
| 18 | S2/2 | 1.0 | W M | 11.7 28.3 | 60 | Al | 94 | 46.3 | 0.38 |
| 19 | S2/2 | 1.0 | W M | 11.7 28.3 | 60 | Al | NIL | 19.5 | 0.85 |
| 20 | S2/2 | 1.03 | W M | 8.27 20 | 60 | Al | 80 | 70.7 | 0.87 |
| 21 | S2/2 | 1.6 | W M | 11.7 28.3 | 60 | Mg | 92 | 58.5 | 0.22 |
| 22* | S5 | 0.7 | A W | 25 3.6 | 25 | NIL | NIL | 27.5 | 0.15 |
| 23 | S2/2 | 1.6 | W M | 11.7 28.3 | 60 | Cu | 94 | 69.2 | 1.59 |

Notes to Table Two
(b) *In this example, the porous support was a coarser membrane, grade GR 81 PP having a molecular weight cut off of about 6000, but otherwise being the same as GR 90 PP.
(c) S5 is a polymer having a reduced viscosity of 1.01 and containing repeating units in proportions such that the polymer contains 5 groups Ph² for each group Ph³.
S10 is a polymer having a reduced viscosity of 0.80 and containing repeating units in proportions such that the polymer contains 10 groups Ph² for each group Ph³.
S2/1 is a polymer having a reduced viscosity of 0.74 and containing repeating units as in Example 1.
S2/2 is a polymer having a reduced viscosity of 1.11 containing the same repeating units as S2/1.
The reduced viscosity was measured at 25° C. using a 1% w/v solution of the polymer in N,N-dimethylformamide.
(d) A is acetone
W is water
M is methanol
(e) This is the temperature to which the mixture was heated to form the solution.
(f) NIL indicates no treatment was effected with a di- or tri- valent metal solution.
Al indicates 0.5 M aqueous aluminium sulphate
Mg indicates 1.0 M aqueous magnesium sulphate
Cu indicates 1.0 M aqueous cupric sulphate. Each metal salt solution was filtered immediately before use.
(h) NIL indicates that no heating treatment was effected.
The number indicates the temperature of the solution of the metal salt on being removed from the oven

TABLE THREE

| Example | S R (%) (i) | Flux (m · day$^{-1}$) (j) |
|---|---|---|
| 12 | 53 | 3.12 |
| 13 | 53 | 0.45 |
| 14 | 56.3 | 1.43 |
| 15 | 80 | 1.02 |
| 16 | 73.7 | 2.44 |
| 17 | 96 | 0.28 |
| 18 | 46.3 | 0.38 |
| 19 | 19.5 | 0.85 |
| 20 | 70.7 | 0.87 |
| 21 | 58.5 | 0.22 |
| 22 | 27.5 | 0.15 |
| 23 | 69.2 | 1.59 |

Notes to Table 3
(i) S R is % salt rejection and is determined from the conductivities of the solution fed to the cell and of the solution permeating the membrane by the relationship:

$$\% \text{ salt rejection} = \left(1 - \frac{\text{conductivity of permeate}}{\text{conductivity of feed}}\right) \times 100$$

(j) Flux is the volume (in m³) of the solution which passes through

I claim:
1. A process for producing a composite membrane, which comprises the following steps:
   (a) applying to the surface of a porous substrate a coating of a solution of a sulphonated polymer which contains repeating units:

(—Ar—Y—)

where Y is —SO$_2$— and/or —CO—; and
   Ar is a divalent aromatic radical which may differ from unit to unit in the polymer chain, at least 50% molar of groups Ar containing at least one group —SO$_3$M where M is hydrogen or a monovalent cation;

(b) treating said coating in situ on the substrate with cations of a polyvalent metal; and (c) converting the treated coating into a water-insoluble layer on the support.

2. A process as in claim 1, wherein said converting into a water-insoluble layer is achieved by heating the treated coating.

3. A process for producing a composite membrane, which comprises:

coating a surface of a porous substrate with an aqueous solution of a water-soluble sulphonated polymer which contains repeating units:

$$(-Ar-Y-)$$

where Y is $-SO_2$ and/or $-CO-$; and

Ar is a divalent aromatic radical which may differ from unit to unit in the polymer chain, the polymer containing groups $-SO_3M$ in which M is hydrogen or a monovalent cation;

converting said polymer into the form of a corresponding polyvalent metal salt; and causing said polyvalent metal form to be deposited as a solid layer on the substrate, said layer and substrate together comprising said composite membrane.

4. A process according to claim 1, in which in step (b) said cations are provided by an aqueous solution of a suitable salt of the polyvalent metal.

5. A process according to claim 1, in which the polyvalent metal is one having a valency of 2 or 3.

6. A process according to claim 5, in which the polyvalent metal is aluminum.

7. A process according to claim 6, in which the polyvalent metal is chromium.

8. A process according to claim 1, in which said solution is a solution in a solvent comprising water.

9. A process according to claim 1, in which said sulphonated polymer is one in which said repeating units comprise repeating units of the formula:

$$(-Ph^1-O-)_n Ph^1-Y-$$

where $Ph^1$ is phenylene and at least some of the groups $Ph^1$ have one or two groups $-SO_3M$ where M is hydrogen or a monovalent cation; and n is either 2 along the polymer chain and substantially all the groups $(-Ph^1-O-)$ have one or two said groups $-SO_3M$, or n differs from 1 to 2 along the polymer chain, the groups $(-Ph^1-O-)$ where n is 2 having one or two said groups $-SO_3M$; and the number of unsulphonated repeating units in the polymer is not more than 30% of the total number of repeating units.

10. A process according to claim 1, in which said sulphonated polymer is one in which said repeating units comprise repeating units of the formula (I):

$$(-Ph^2-O-Ph^3-O-Ph^2-Y-) \qquad (I)$$

and, optionally, repeating units of the formula (II):

$$(-Ph^2-O-Ph^2-Y-) \qquad (II)$$

where $Ph^2$ is phenylene;

$Ph^3$ is phenylene having one or two groups $-SO_3M$ where M is hydrogen or a monovalent cation;

provided that the number of units of formula II is not more than 30% of the total number of repeating units.

11. A process according to claim 10, in which said sulphonated polymer contains repeating units of formula II, the number of units of formula (II) being less than 10% of the total number of units of formulae I and II.

12. A process according to claim 11, in which in said sulphonated polymer the number of units of formula (II) is less than 1%.

13. A process according to claim 10, in which said sulphonated polymer also contains repeating units of the formula (III):

$$(-Ph^2-O-Ph^2-O-Ph^2-Y-) \qquad (III)$$

where $Ph^2$ is phenylene.

14. A process according to claim 13, in which said sulphonated polymer contains repeating units of the formula II, and the total number of units of formula II and the units of formula (III) constitute not more than 30% of the total of the number of the units of formulae I, II and III.

15. A process according to claim 9, in which said sulphonated polymer consists of the repeating units $$(-Ph^2-O-Ph^3-O-Ph^2-SO_2-)$$

where $Ph^2$ is para-phenylene; and $Ph^3$ is para-phenylene containing a $-SO_3M$ group where M is hydrogen or a monovalent cation.

16. A process according to claim 9, in which said sulphonated polymer consists of the repeating units $$(-Ph^2-O-Ph^3-O-Ph^2-CO-)$$

where $Ph^2$ is para-phenylene; and $Ph^3$ is para-phenylene containing a $-SO_3M$ group M is hydrogen or a monovalent cation.

17. A process for the desalination of sea water, or for the purification of brackish water and industrial effluents, by effecting reverse osmosis or ultrafiltration using a membrane made by the process of claim 1.

* * * * *